United States Patent [19]

Iwasaki et al.

[11] Patent Number: 4,834,926

[45] Date of Patent: May 30, 1989

[54] PROCESS FOR PRODUCING SILICON NITRIDE CERAMIC ARTICLES

[75] Inventors: Hiroyuki Iwasaki; Masaaki Masuda, both of Nagoya, Japan

[73] Assignee: NGK Insulators, Ltd., Nagoya, Japan

[21] Appl. No.: 138,956

[22] Filed: Dec. 29, 1987

[30] Foreign Application Priority Data

Jan. 12, 1987 [JP] Japan .................. 62-3243/87
Dec. 8, 1987 [JP] Japan .................. 62-308775

[51] Int. Cl.⁴ .............................. C04B 33/32
[52] U.S. Cl. .............................. 264/65; 264/66; 264/67
[58] Field of Search .............................. 264/67, 65, 66

[56] References Cited

U.S. PATENT DOCUMENTS 4,702,869 10/1987 Higuchi et al. .................. 264/67

FOREIGN PATENT DOCUMENTS 52-30811 3/1977 Japan .
58-79885 5/1983 Japan .
60-81076 5/1985 Japan .
61-178472 8/1986 Japan .

*Primary Examiner*—James Derrington
*Attorney, Agent, or Firm*—Parkhurst, Oliff & Berridge

[57] ABSTRACT

A process for producing silicon nitride ceramic articles is disclosed, which includes the steps of preparing a mixed powder of silicon nitride and a sintering aid, shaping the mixed powder, sintering the shaped body, machining the sintered body in a desired shape, and then heating the machined sintered body in a temperature range from 550° C. to 900° C. in an oxidizing atmosphere. Alternatively, after the sintering, the sintered body is heated in a temperature range from 950° C. to 1,400° C. to crystallize an $Si_3N_4$ grain boundary phase, the crystallized sintered body is machined into a desired shape, and the machined body is heated in a temperature range from 550° C. to 900° C. in an oxidizing atmosphere. Thereby, silicon nitride ceramic articles having high strength at room temperature can be obtained.

5 Claims, 1 Drawing Sheet

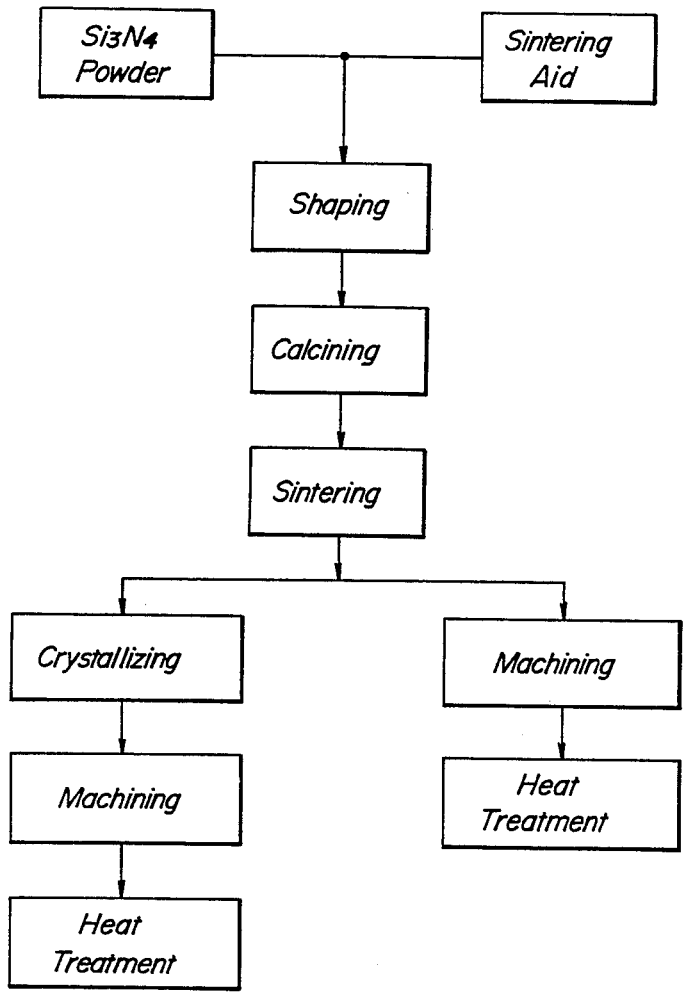

PROCESS FOR PRODUCING SILICON NITRIDE CERAMIC ARTICLES

BACKGROUND OF THE INVENTION (1) Field of the Invention:

The present invention relates to a process for producing silicon nitride ceramic articles, which can attain high strength at room temperature. More particularly, the invention relates to a process for producing silicon nitride ceramic articles, which is characterized by heating silicon nitride sintered products machined in a given shape in a temperature range from 550° C. to 900° C. in an oxidizing atmosphere.

(2) Background of the Invention:

In conventional techniques, silicon nitride ceramic articles have been produced by mixing a sintering aid and $Si_3N_4$ powder, grinding and shaping the thus obtained mixture, and firing the shaped bodies to obtain sintered bodies, followed by (1) machining the sintered bodies, (2) further crystallizing them after the machining, or (3) crystallizing and then machining the sintered bodies. In such a case, the crystallization treatment is to increase strength at high temperature, and is effected to convert a glass phase in $Si_3N_4$ sintered bodies to a crystalline phase.

However, the above-mentioned technique (1) in which only the machining is effected has a defect that machining scratches and cracks remain on surfaces of the silicon nitride ceramic articles to reduce strength at room temperature. To compensate such a defect, as described in Japanese patent application Laid-open No. 60-81,076, scratches and cracks formed on surfaces of sintered bodies by machining after sintering are removed by heating them in a temperature range from 950° to 1,400° C. However, it happens that their color and/or dimension changes, which may lead to deterioration in characteristics. In the technique (2) in which the crystallization is effected after the machining, there is a defect that although no reduction in bending strength at room temperature is seen, the technique cannot be applied to products necessitating high dimensional precision because a dimension slightly becomes smaller after the crystallizing treatment. On the other hand, the technique (3) in which the machining is effected after the crystallization has a defect that though this technique can be applied to products requiring high dimensional precision, machining scratches or cracks remain on surfaces thereof to lower strength at room temperature.

In Japanese patent application Laid-open Nos. 52-30,811, 58-79,885, and 61-178,472, it is reported that strength has been attempted to be improved by heating silicon nitride sintered bodies in a temperature range from 500° to 1,100° C., but these applications are directed to sintered bodies only which have not undergone a machining treatment. However, they have no investigations of sintered bodies having undergone machining as in the present invention.

SUMMARY OF THE INVENTION

It is an object of the present invention to obviate the above-mentioned defects, and to provide a process for producing silicon nitride ceramic articles, which can prevent reduction in strength at room temperature and also prevent color change and dimensional change.

The process for producing silicon nitride ceramic articles according to the present invention comprises the steps of preparing a mixed powder of silicon nitride containing a sintering aid, shaping the mixed powder, sintering the thus shaped body, machining the sintered body to a given shape, and then heating the machined product in a temperature range from 550° C. to 900° C. in an oxidizing atmosphere.

Further, the process for producing silicon nitride ceramic articles according to the present invention alternatively comprises steps of preparing a mixed powder of silicon nitride containing a sintering aid, shaping the mixed powder, sintering the shaped body, heating the sintered body in a temperature range from 950° C. to 1,400° C. to crystallize an $Si_3N_4$ grain boundary phase, machining the thus crystallized product to a given shape, and then heating the machined product in a temperature range from 550° C. to 900° C. in an oxidizing atmosphere.

By the above-mentioned steps, a surface portion of the body machined in a given shape is oxidized during heating in a temperature range from 550° C. to 900° C. in an oxidizing atmosphere, thereby removing machining scratches and cracks. Since a degree of oxidation in a temperature range from 550° C. to 900° C. is slight, characteristics of the sintered body will not be damaged.

In the second aspect of the present invention, a crystallized grain boundary phase of the sintered body near the surface thereof is expanded in volume through oxidation by machining and then heating the sintered body in a temperature range from 550° C. to 900° C. after the crystallization so that a compression stress is applied to the surface portion of the machined sintered body to remove influences of machining scratches and cracks. Strength of silicon nitride sintered bodies at room temperature can be prevented from lowering according to the present invention by either one or both of such an oxidizing phenomenon near the surface that does not adversely influence properties of the sintered bodies and the compression stress near the surface.

These and other objects, features and advantages of the present invntion will be appreciated upon reading of the following description of the invention when taken in conjunction with the attached drawing, with undertanding that some modifications, variations and changes of the same could be made by the skilled in the art to which the invention pertains without departing from the spirit of the invention or the scope of claims appended hereto.

BRIEF DESCRIPTION OF THE DRAWING

For a better undertanding of the invention, reference is made to the attached drawing, wherein:

A sole FIGURE is a flow chart showing steps of the process for producing silicon nitride ceramic articles according to the present invention.

DETAILED DESCRIPTION OF THE INVENTION

Since four point bending strength of the sintered body needs to be measured according to JIS R 1601, surface roughness Rmax of sintered bodies after the machining is ordinarily finished to 0.8 $\mu$m (0.8S) or less. The present invention is effective for the thus surface-finished sintered bodies. Further, it is to be particularly noted that even sintered bodies having the surface roughness Rmax of more than 0.8 $\mu$m come to have the same strength as that of sintered bodies having the finished surface roughness Rmax of not more than 0.8 μm by effecting the heat treatment according to the present invention.

The reason why the heating temperature is limited to a temperature range from 550° C. to 900° C. is that if it is less than 550° C., almost no oxidation occurs. If it is more than 900° C., color change and/or dimensional change which leads to deteriorated characteristics due to oxidation begins to occur. Thus, the products are damaged. The heating temperature is preferably in a temperature range from 550° C. to 800° C. The reason is that since the sintered articles having a smaller degree of color change and/or dimensional change which may result in deteriorated characteristics due to oxidation can be obtained in this temperature range, the process according to the present invention can readily be applied to products necessitating high precision and high performances, such as engine parts.

Magnesia is preferably contained in the sintered bodies as a sintering aid. The reason is that a compound of magnesia exhibits an effect of promoting densification of silicon nitride, and expedites phase transformation to needle-like β-silicon nitride crystals which are advantageous for high strength. Thus, incorporation of magnesia is advantageous for obtaining high strength silicon nitride ceramic articles aimed at by the present invention. It is preferable that magnesia is contained in an amount of 0.1 to 30% by weight when calculated as MgO. Further, it is preferable that yttria is contained in the sintering aid. The reason is that yttria effectively expands the volume of the crystallized grain boundary phase by oxidation. Yttria is preferably contained in an amount from 0.1 to 20% by weight when calculated as $Y_2O_3$. In this case, the crystallized grain boundary phase may contain a crystalline phase which expands in volume through oxidation. Besides yttria, an oxide of any other rare earth element may be used so long as it attains such an effect. The grain boundary phase is preferably H phase or J phase.

The reasons why temperature of the crystallizing before the machining step is limited to a temperature range from 950° to 1,400° C. is that if it is less than 950° C., the grain boundary phase will not be crystallized, while if it exceeds 1,400° C., the grain boundary phase begins to transform into glass.

FIG. 1 is a flow chart showing steps of the process for producing silicon nitride ceramic articles according to the present invention. First, given amounts of powdery silicon nitride and a sintering aid are mixed and ground, and the thus ground mixture is shaped into a desired form. The shaped body is calcined to remove a shaping aid, and is fired to obtain a sintered body. After the sintered body is machined to a desired shape, it is heated in a temperature range from 550° C. to 900° C. in an oxidizing atmosphere. Alternatively, the sintered body is subjected to a crystallization treatment in a temperature range from 950° C. to 1,400° C., machined to a desired shape, and then heated in a temperature range from 550° C. to 900° C. in an oxidizing atmosphere. Thereby, a silicon nitride ceramic article is finally obtained.

In the following, specific examples of the present invention will be explained. These examples are merely given in illustration of the invention, but should never be interpreted to limit the scope thereof.

EXAMPLE 1

To 90.5% by weight of powdery silicon nitride was added sintering aids of Sr, Mg, and Ce in amounts of 1%, 4%, and 4.5% when calculated by weight as $SrO_2$, MgO and $CeO_2$, respectively. The mixture was mixed and ground for 10 hours by a vibration mill, and granulated and dried by a spray drier, thereby obtaining a mixed powder. Then, the powder was isostatically pressed in a shape of 60x60x6 mm under a pressure of 3 ton/cm$^2$, and the shaped body was calcined and then sintered at 1,750° C. for 1 hour in a nitrogen atmosphere. The sintered body was cut with a diamond grinding stone and ground to obtain sixty bending test pieces of 3×4×40 mm. Next, thirty of the test pieces were heated at 800° C. for 2 hours in air according to the present invention. The four point bending strengths of the thus obtained test pieces were measured at room temperature according to JIS R 1601. Results are shown in the following Table 1. In Table 1, the Comparative Examples are the remaining thirty test pieces as conventional articles having undergone no heat treatment after the machining.

TABLE 1

|  | Average bending strength | Weibull modulus |
| --- | --- | --- |
| Present invention | 92 kg/mm$^2$ | 18 |
| Comparative Example | 73 kg/mm$^2$ | 14 |

It is seen from the results in Table 1 that the articles according to the present invention having undergone the heat treatment have higher average bending strength at room temperature and higher Weibull modulus with the smaller variations as compared with Comparative Examples having undergone no heat treatment. Further, the test pieces within in the present invention were visually observed and their dimensions were measured, and neither color change nor dimensional change was recognized.

EXAMPLE 2

To 84% by weight of powdery silicon nitride was added sintering aids of Y, Mg, and Ce in amounts of 8%, 6% and 2% when calculated by weight as $Y_2O_3$, MgO, and $CeO_2$, respectively. A silicon nitride sintered body was obtained in the same manner as in Example 1. Next, the thus obtained sintered body was heated at 1,200° C. in a nitrogen atmosphere for 2 hours to crystallize a grain boundary phase. The crystallized sintered body was cut with a diamond grinding stone, and ground to obtain sixty bending test pieces of 3×4×40 mm. Next, thirty test pieces were heated at 600° C. in air for 5 hours according to the present invention. The four point bending strengths of these test pieces were measured at room temperature according to JIS R 1601. Results are shown in Table 2. In Table 2, the Comparative Examples are the remaining thirty test pieces as conventional examples which have undergone the crystallization treatment and the succeeding machining but no heat treatment.

TABLE 2

|  | Average bending strength | Weibull modulus |
|---|---|---|
| Present invention | 88 kg/mm$^2$ | 20 |
| Comparative Example | 67 kg/mm$^2$ | 14 |

It is seen from the results in Table 2 that the articles having undergone the heat treatment according to the present invention had higher a average bending strength and higher Weibull modulus as compared with the Comparative Examples having undergone no heat treatment. Further, the obtained test pieces falling in the present invention were visually observed and their dimensions were measured, and neither color change nor dimensional change was recognized.

EXAMPLE 3

A sintered body was prepared in the same manner as in Example 2, and bending strength test pieces and dimensional change test pieces of 5×5×10 mm were similarly machined. With respect to the thus obtained bending strength test pieces and dimensional change test pieces, the average bending strength, Weibull modulus, and dimensional change was measured and color change was observed, while their heating conditions in air were varied. Results are shown in Table 3. The dimensional change was calculated by the following equation.

$$\frac{\text{dimension after heat treatment} - \text{dimension before heat treatment}}{\text{dimension before heat treatment}}$$

TABLE 3

|  | Heating temperature (°C.) | Time (Hr) | Average bending strength (kg/mm$^2$) | Weibull modulus | Dimensional change (PPM) | Color change |
|---|---|---|---|---|---|---|
| Present invention | 550 | 0.5 | 86 | 18 | not more than 100 | no |
|  | 600 | 10 | 90 | 20 | not more than 100 | no |
|  | 600 | 50 | 88 | 22 | not more than 100 | no |
|  | 850 | 0.5 | 88 | 18 | not more than 100 | no |
| Comparative Example | 500 | 0.5 | 66 | 13 | not more than 100 | no |
|  | 500 | 10 | 67 | 14 | not more than 100 | no |
|  | 1000 | 1 | 74 | 12 | 700 | changed |

It is seen from the results in Table 3 that the Examples in which the temperature was in a temperature range from 550° C. to 900° C. in the heat treatment according to the present invention had a higher average bending strength at room temperature and higher Weibull modulus with a smaller dimensional change and no color change.

EXAMPLE 4

To 89.5% by weight of powdery silicon nitride was added 1% by weight of SrO$_2$, 4% by weight of MgO, 4% by weight of CeO$_2$, and 1.5% by weight of ZrO$_2$, and a silicon nitride sintered body was obtained in the same manner as in Example 1.

Next, in order to examine the relationship between the surface roughness after machining and the heating temperature, test pieces were machined in the form of 3×4×40 mm in accordance with JIS R 1601, and test pieces having different surface roughness values were prepared by varying the grain degree of diamond grinding stones used for finishing. Heating temperature was set in a temperature range from 600° to 900° C. According to JIS R 1601, four point bending strengths were measured, and results are shown in Table 4. Although this JIS item specifies that the surface roughness Rmax of a test piece should be not more than 0.8 μm, it was revealed that reduction in strength of the test pieces having even more than 0.8 μm was prevented by effecting the heat treatment according to the present invention even when a loading direction was perpendicular to a grinding direction.

TABLE 4

| | Heating temperature and Strength | | | |
|---|---|---|---|---|
| Grinding conditions | Heating temperature in annealing treatment (°C.) | Surface roughness R$_{max}$ (μm) | | Average bending strength (kg/mm$^2$) |
| | | parallel | perpendicular | |
| #800 (parallel) | not treated | 0.36 | 0.65 | 90 ± 4 |
| | 800 | 0.67 | 1.28 | 93 ± 1 |
| #400 (parallel) | not treated | 0.68 | 1.43 | 83 ± 10 |
| | 800 | 1.25 | 1.44 | 93 ± 5 |
| #400 (perpendicular) | not treated | 1.05 | 0.77 | 77 ± 5 |
| | 800 | 1.36 | 1.27 | 97 ± 5 |
| #200 (perpendicular) | not treated | 4.85 | 1.26 | 65 ± 6 |
| | 600 | | | 73 ± 2 |
| | 800 | 5.13 | 2.13 | 89 ± 3 |
| | 900 | | | 93 ± 3 |

As is clear from the foregoing explanation, according to the process for producing the silicon nitride ceramic articles of the present invention, reduction in strength at room temperature can be prevented by heating the sintered bodies in a temperature range from 550° C. to 900° C. in an oxidizing atmosphere after machining it in a desired shape or after crystallizing and then machining it in a desired shape. Since the heating temperature is in a low temperature range from 550° C. to 900° C., the invention process is economical and is free from color change or dimensional change.

Further, even if the surface roughness Rmax is not adjusted to not more than 0.8 μm in the measurement of four point bending strength, the same effect can be attained by effecting the annealing treatment according to the present invention. In addition, since actually used silicon nitride sintered articles have complicated shapes, it is extremely difficult to finish whole surface to a roughness Rmax of not more than 0.8 μm. However, the same strength of a test piece as defined in JIS R 1601 can be attained by the annealing treatment according to the present invention.

What is claimed is:
1. A process for producing silicon nitride ceramic articles, comprising:
   preparing a mixed powder of silicon nitride and a sintering aid;

shaping the mixed power to form a shaped body;
sintering the shaped body to form a sintered body;
heating the sintered body in a temperature range of 950° C.–1400° C. to crystallize a $Si_3N_4$ grain boundary phase and form a crystallized sintered body;
machining the crystallized sintered body into a desired shape; and
heating the machined sintered body in a temperature range of 550° C.–900° C. in an oxidizing atmosphere.

2. A process according to claim 1, wherein a surface roughness of the machined sintered body is more than 0.8 μm.

3. A process according to claim 1, wherein the sintering aid contains magnesia.

4. A process according to claim 3, wherein the sintering aid contains yttria.

5. A process according to claim 2, wherein the machined sintered body is heated in a temperature range of 550° C.–800° C.

* * * * *